(12) United States Patent
Kim

(10) Patent No.: US 10,318,211 B2
(45) Date of Patent: Jun. 11, 2019

(54) MEMORY SYSTEM AND METHOD OF OPERATING THE SAME

(71) Applicant: SK hynix Inc., Gyeonggi-do (KR)

(72) Inventor: Min Kee Kim, Sejong-si (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 15/893,790

(22) Filed: Feb. 12, 2018

(65) Prior Publication Data

US 2019/0018611 A1 Jan. 17, 2019

(30) Foreign Application Priority Data

Jul. 17, 2017 (KR) .......................... 10-2017-0090345

(51) Int. Cl.
*G06F 3/06* (2006.01)

(52) U.S. Cl.
CPC .......... *G06F 3/0659* (2013.01); *G06F 3/0625* (2013.01); *G06F 3/0653* (2013.01); *G06F 3/0679* (2013.01)

(58) Field of Classification Search
CPC .... G06F 3/0659; G06F 3/0625; G06F 3/0653; G06F 3/0679
USPC ....................................................... 365/226
See application file for complete search history.

(56) References Cited

U.S. PATENT DOCUMENTS

| | | | | |
|---|---|---|---|---|
| 2005/0259496 | A1* | 11/2005 | Hsu ......................... | G06F 1/206 365/226 |
| 2009/0016137 | A1* | 1/2009 | Hur ...................... | G06F 13/1626 365/226 |
| 2015/0301744 | A1* | 10/2015 | Kim ...................... | G06F 3/0679 711/103 |
| 2017/0075611 | A1* | 3/2017 | Choi ..................... | G06F 3/0625 |

FOREIGN PATENT DOCUMENTS

| | | |
|---|---|---|
| KR | 1020160137180 | 11/2016 |
| KR | 1020170031608 | 3/2017 |

\* cited by examiner

*Primary Examiner* — Xiaochun L Chen
(74) *Attorney, Agent, or Firm* — IP & T Group LLP

(57) ABSTRACT

Provided herein may be a memory system and a method of operating the same. The memory system may include a memory controller, and a plurality of memory devices coupled to the memory controller through a plurality of channels. The memory controller may include a power consumption measurement unit configured to measure power consumption of a memory system at intervals of a predetermined time period and to generate a first signal based on the measured power consumption, and a performance throttling control unit configured to perform an operation of changing performance of the memory system in response to the first signal. The performance throttling control unit may be configured to perform the operation of changing the performance of the memory system a plurality of times within the predetermined time period.

20 Claims, 12 Drawing Sheets

```
┌─────────────────────────────────────────────────────────────┐
│ MEASURE TEMPERATURE AT INTERVALS OF PREDETERMINED TIME PERIOD│─ S101
└─────────────────────────────────────────────────────────────┘
                              │
                              ▼
┌─────────────────────────────────────────────────────────────┐
│    ADJUST TARGET PERFORMANCE AT INTERVALS OF PREDETERMINED  │─ S102
│    TIME PERIOD BASED ON RESULT OF TEMPERATURE MEASUREMENT   │
└─────────────────────────────────────────────────────────────┘
                              │
                              ▼
┌─────────────────────────────────────────────────────────────┐
│      PERFORM OPERATION OF CHANGING NUMBER OF ACTIVE         │
│    MEMORY DIES PLURALITY OF TIMES WITHIN PREDETERMINED      │─ S103
│         TIME PERIOD BASED ON TARGET PERFORMANCE             │
└─────────────────────────────────────────────────────────────┘
```

MEMORY SYSTEM AND METHOD OF OPERATING THE SAME

CROSS-REFERENCE TO RELATED APPLICATION

The present application claims priority to Korean patent application number 10-2017-0090345, filed on Jul. 17, 2017, which is incorporated herein by reference in its entirety.

BACKGROUND

1. Technical Field

Various embodiments of the present disclosure generally relate to a memory system. Particularly, the embodiments relate to a memory system that is capable of optimally controlling the performance and temperature thereof.

2. Related Art

Semiconductor memory devices may be classified into a volatile semiconductor memory device and a nonvolatile semiconductor memory device. A volatile semiconductor memory device is advantageous in that read and write operations may be performed at high speeds, but is disadvantageous in that stored information is lost when the supply of power is interrupted. In contrast, a nonvolatile semiconductor memory device may retain information stored therein even if the supply of power is interrupted. Therefore, the nonvolatile semiconductor memory device is used to store information that needs to be retained regardless of whether power is supplied.

Examples of the nonvolatile semiconductor memory device may include a mask read-only memory (MROM), a programmable read-only memory (PROM), an erasable programmable read-only memory (EPROM), an electrically erasable programmable read-only memory (EEPROM), etc.

An example of the nonvolatile semiconductor memory device may include a flash memory device. A flash memory device has been widely used as an audio and video data storage medium for electronic devices, such as a computer, a mobile phone, a personal digital assistant (PDA), a digital camera, a camcorder, a voice recorder, an MP3 player, a handheld personal computer (PC), a game console, a facsimile, a scanner, and a printer.

Recently, as a demand for high integration of memory devices has increased, multi-bit flash memory devices in which multiple bits are stored in a single memory cell have been popular.

Current nonvolatile memory systems are generally equipped with a performance throttling function. Such a performance throttling function decreases the performance of a memory system to reduce power consumption or lower the temperature of the memory system. This function is mainly used in order for a memory system to protect the system itself from exceeding a power threshold indicating allowable power consumption.

However, the performance throttling function may occasionally be a factor that excessively deteriorates the performance of a memory system.

SUMMARY

Various embodiments of the present disclosure are directed to a memory system and a method of operating the memory system, which can optimize the temperature and performance of the memory system.

An embodiment of the present disclosure may provide for a memory system. The memory system may include a memory controller, and a plurality of memory devices coupled to the memory controller through a plurality of channels, wherein the memory controller may include a power consumption measurement unit configured to measure power consumption of a memory system at intervals of a predetermined time period and to generate a first signal based on the measured power consumption, and a performance throttling control unit configured to perform an operation of changing a performance of the memory system in response to the first signal, wherein the performance throttling control unit is configured to perform the operation of changing the performance of the memory system a plurality of times within the predetermined time period.

An embodiment of the present disclosure may provide for a memory system. The memory system may include a memory controller, and a plurality of memory dies coupled to the memory controller through a plurality of channels, wherein the memory controller may include a temperature measurement unit configured to measure a temperature of the memory system at intervals of a predetermined time period and to adjust a target performance of the memory system based on the measured temperature, and a number-of-active dies control unit configured to perform an operation of changing a number of active memory dies, among the memory dies, in response to the target performance. The number-of-active dies control unit may be configured to perform the operation of changing the number of active memory dies a plurality of times within the predetermined time period.

An embodiment of the present disclosure may provide for a method of operating a memory system. The method may include measuring a temperature at intervals of a predetermined time period, adjusting a target performance at intervals of the predetermined time period based on a result of temperature measurement, and performing an operation of controlling a number of active memory dies based on the target performance, wherein the operation of controlling the number of active memory dies is performed a plurality of times within the predetermined time period.

An embodiment of the present disclosure may provide for an operating method of a memory system including one or more memory dies. The method may include measuring power consumption and temperature of the memory system one or more times during a first period, and adjusting a performance of the memory dies by selectively activating or deactivating each of the memory dies based on the measuring at a second period, wherein the second period is the same as or shorter than the first period.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention.

It will be understood that when an element is referred to as being "coupled" or "connected" to a certain element, it may be directly coupled or connected to the certain element or may be indirectly coupled or connected to the certain element, with intervening elements being present therebetween. In the specification, when an element is referred to as "comprising" or "including" a component, it does not exclude other components but may further include other components unless a description to the contrary is specifically pointed out in context.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

Hereinafter, the various embodiments of the present invention will be described in detail with reference to the attached drawings.

Figure 1:
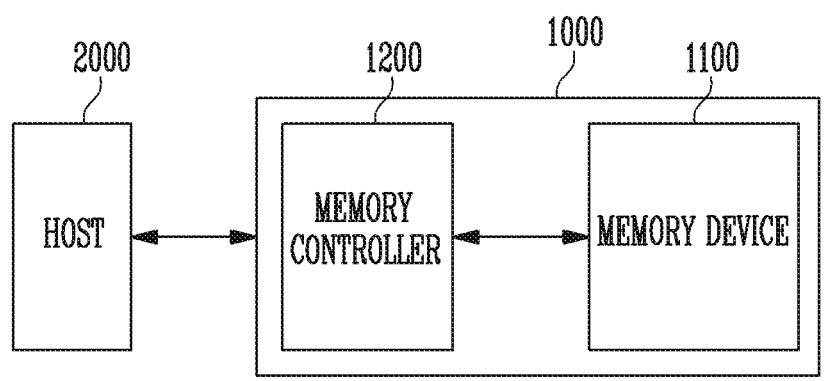
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a memory device 1100 for storing data and a memory controller 1200 for controlling the memory device 1100 under the control of a host 2000.

The host 2000 may communicate with the memory system 1000 using an interface protocol such as a peripheral component interconnect-express (PCI-E), an advanced technology attachment (ATA), a serial ATA (SATA), a parallel ATA (PATA) or a serial attached SCSI (SAS). In addition, the interface protocol provided for the purpose of data communication between the host 2000 and the memory system 1000 is not limited to the above examples and may be an interface protocol such as a Universal Serial Bus (USB), a Multi-Media Card (MMC), an Enhanced Small Disk Interface (ESDI), or Integrated Drive Electronics (IDE).

The memory controller 1200 may control overall operation of the memory system 1000 and may control data exchange between the host 2000 and the memory device 1100. For example, the memory controller 1200 may program or read data by controlling the memory device 1100 in response to a request from the host 2000. Further, the memory controller 1200 may store information of main memory blocks and sub-memory blocks included in the memory device 1100, and may select the memory device 1100 so that a program operation is performed on a main memory block or a sub-memory block depending on the amount of data that is loaded for the program operation. In an embodiment, examples of the memory device 1110 may include a double data rate synchronous dynamic random access memory (DDR SDRAM), a low power double data rate 4 (LPDDR4) SDRAM, a graphics double data rate SDRAM (GDDR SDRAM), a low power DDR (LPDDR) SDRAM, a Rambus dynamic random access memory (RDRAM), or a flash memory.

The memory device 1100 may perform a program operation, a read operation, or an erase operation under the control of the memory controller 1200.

Figure 2:
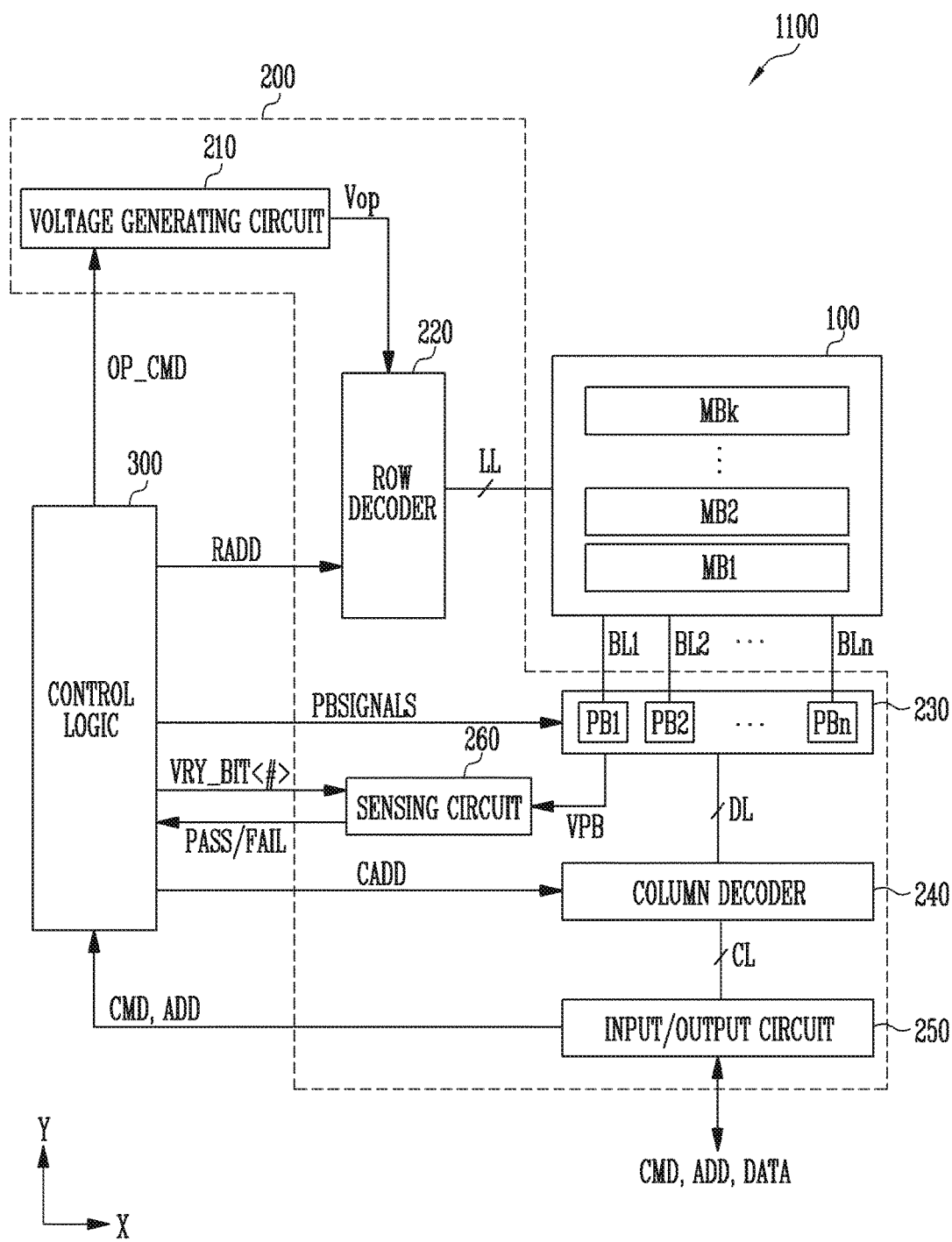
FIG. 2 is a diagram illustrating a memory device of FIG. 1.

FIG. 2 is a diagram illustrating the memory device 1100 of FIG. 1.

Referring to FIG. 2, the memory device 1100 may include a memory cell array 100 in which data is stored. The memory device 1100 may also include peripheral circuits 200, which perform a program operation for storing data in the memory cell array 100, a read operation for outputting stored data, and an erase operation for erasing stored data. The memory device 1100 may include a control logic 300, which controls the peripheral circuits 200 under the control of a memory controller (e.g., 1200 of FIG. 1).

The memory cell array 100 may include a plurality of memory blocks MB1 to MBk (where k is a positive integer). Local lines LL and bit lines BL1 to BLn (where n is a positive integer) may be coupled to each of the memory blocks MB1 to MBk. For example, the local lines LL may include a first select line, a second select line, and a plurality of word lines arranged between the first and second select lines. Further, the local lines LL may include dummy lines arranged between the first select line and the word lines and between the second select line and the word lines. Here, the first select line may be a source select line, and the second select line may be a drain select line. For example, the local lines LL may include word lines, drain and source select lines, and source lines. For example, the local lines LL may further include dummy lines. For example, the local lines LL may further include pipelines. The local lines LL may be coupled to the memory blocks MB1 to MBk, respectively, and the bit lines BL1 to BLn may be coupled in common to the memory blocks MB1 to MBk. The memory blocks MB1 to MBk may be implemented as a two-dimensional (2D) or a three-dimensional (3D) structure. For example, the memory cells in the memory blocks 110 having a 2D structure may be arranged horizontally on a substrate. For example, memory cells in the memory blocks 110 having a 3D structure may be stacked vertically on the substrate.

The peripheral circuits 200 may perform a program, read, or erase operation on a selected memory block among the memory blocks under the control of the control logic 300. For example, the peripheral circuits 200 may supply a verify voltage and pass voltages to the first select line, the second select line, and the word lines, may selectively discharge the first select line, the second select line, and the word lines, and may verify memory cells coupled to a word line selected from among the word lines, under the control of the control logic 300. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Further, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, etc. under the control of the control logic 300.

The row decoder 220 may transfer the operating voltages Vop to the local lines LL coupled to a selected memory block among the memory blocks in response to a row address RADD.

The page buffer group 230 may include a plurality of page buffers PB1 to PBn coupled to the bit lines BL1 to BLn. The page buffers PB1 to PBn may be operated in response to page buffer control signals PBSIGNALS. For example, the page buffers PB1 to PBn may temporarily store data received through the bit lines BL1 to BLn or may sense the voltages or currents of the bit lines BL1 to BLn during a read or a verify operation.

The column decoder 240 may transfer data between the input/output circuit 250 and the page buffer group 230 in response to a column address CADD. For example, the column decoder 240 may exchange data with the page buffers PB1 to PBn through data lines DL or may exchange data with the input/output circuit 250 through column lines CL.

The input/output circuit 250 may transfer a command CMD and an address ADD received from the memory controller (not illustrated) to the control logic 300, or may exchange data DATA with the column decoder 240.

The sensing circuit 260 may generate a reference current in response to an enable bit VRY_BIT<#> and may output a pass signal PASS or a fail signal FAIL by comparing a sensing voltage VPB, received from the page buffer group 230, with a reference voltage, generated based on the reference current, during the read operation or the verify operation.

The control logic 300 may control the peripheral circuits 200 by outputting the operation signal OP_CMD, the row address RADD, the page buffer control signals PBSIGNALS, and the enable bit VRY_BIT<#> in response to the command CMD and the address ADD. Further, the control logic 300 may determine whether a verify operation has passed or failed in response to the pass or fail signal PASS or FAIL.

In the operation of the memory device 1100, each memory block 110 may be the unit of an erase operation. In other words, a plurality of memory cells included in a single memory block 110 may be simultaneously erased, but may not be selectively erased.

Figure 3:
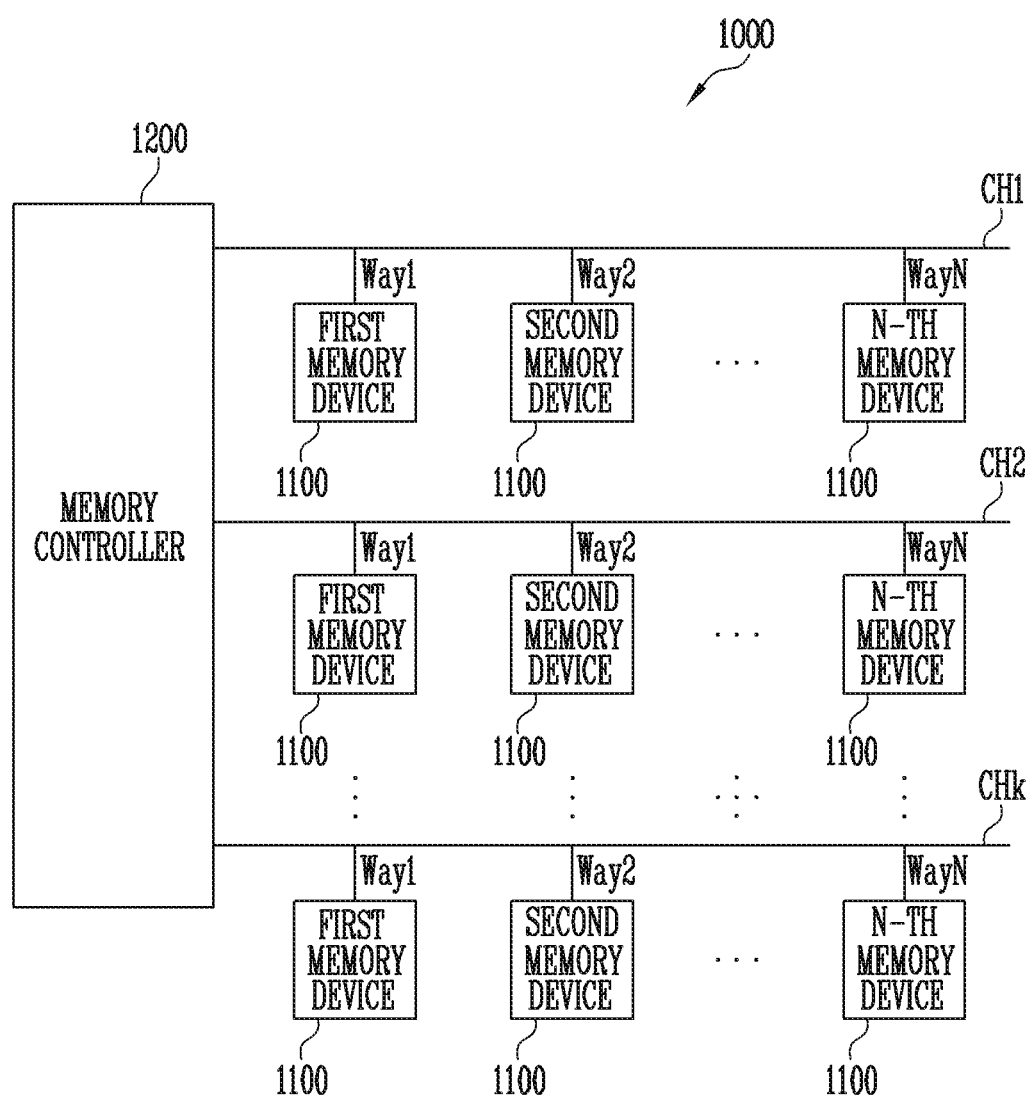
FIG. 3 is a diagram illustrating a memory system according to an embodiment of the present disclosure.

FIG. 3 is a diagram illustrating the memory system 1000 according to an embodiment of the present disclosure. The memory system 1000 may include a memory controller 1200 and a plurality of memory devices 1100 coupled to the memory controller 1200 through a plurality of channels CH1 to CHk.

Referring to FIG. 3, the memory controller 1200 may communicate with the plurality of memory devices 1100 through the plurality of channels CH1 to CHk. Each of the channels CH1 to CHk may be coupled to one or more memory devices 1100. Further, the memory devices 1100 coupled to different channels may be operated independently of each other. In other words, the memory device 1100 coupled to the first channel CH1 and the memory device 1100 coupled to the second channel CH2 may be operated independently of each other. For example, the memory controller 1200 may exchange data or commands with the memory device 1100, coupled to the second channel CH2, through the second channel CH2 in parallel to the first channel CH1 while exchanging data or commands with the memory device 1100, coupled to the first channel CH1, through the first channel CH1. Further, while the memory device 1100 coupled to the first channel CH1 performs a program operation, the memory device 1100 coupled to the second channel CH2 may perform a read operation.

Each of the plurality of channels CH1 to CHk may be coupled to a plurality of memory devices 1100. Here, a plurality of memory devices 1100 coupled to a single channel may configure different ways, respectively. In an embodiment, N memory devices 1100 may be coupled to a single channel, and respective memory devices 1100 may configure different ways. That is, the first to N-th memory devices 1100 may be coupled to the first channel CH1, wherein the first memory device 1100 may configure a first way Way1, the second memory device 1100 may configure a second way Way2, and the N-th memory device 1100 may configure an N-th way WayN. Further, unlike the configuration of FIG. 3, two or more memory devices 1100 may configure a single way.

Since the first to N-th memory devices 1100 coupled to the first channel CH1 share the channel, they may exchange data or commands with the memory controller 1200 sequentially, but not simultaneously. In other words, while the memory controller 1200 is transmitting data to the first memory device 1100 configuring the first way Way1 of the first channel CH1 through the first channel CH, the second to N-th memory devices 1100 configuring the second to N-th ways Way2 to WayN of the first channel CH1 cannot exchange data or commands with the memory controller 1200 through the first channel CH1. That is, while any one of the first to N-th memory devices 1100 sharing the first channel CH1 occupies the first channel CH1, other memory devices 1100 coupled to the first channel CH1 cannot use the first channel CH1.

For example, the first to N-th memory devices 1100 coupled to the first channel CH1 may simultaneously perform program operations. In other words, the memory controller 1200 may sequentially transmit program commands to respective first to N-th memory devices 1100 coupled to the first channel CH1, and the first to N-th memory devices 1100 coupled to the first channel CH1 internally and respectively perform program operations in response to the program commands. The internal program operations performed by the respective first to N-th memory devices 1100 may be implemented in parallel to each other.

The first memory device 1100 configuring the first way Way1 of the first channel CH1 and the first memory device 1100 configuring the first way Way1 of the second channel CH2 may communicate with the memory controller 1200, independently of each other. In other words, the memory controller 1200 may exchange data with the first memory device 1100 configuring the first way Way1 of the second channel CH2 through the second channel CH2 while the first memory device 1100 configuring the first way Way1 of the first channel CH1 exchanges data with the first memory device 1100 configuring the first way Way1 of the first channel CH1 through the first channel CH1.

In an example, when a single way is assigned to each channel, the maximum number of memory devices 1100 that are simultaneously operable in the memory system 1000 may be identical to the number of channels. In another example, when a plurality of ways are assigned to each channel, a number of memory devices 1100 identical to a number, obtained by multiplying the number of ways by the number of channels in the memory system 1000, may be simultaneously operated.

Figure 4:
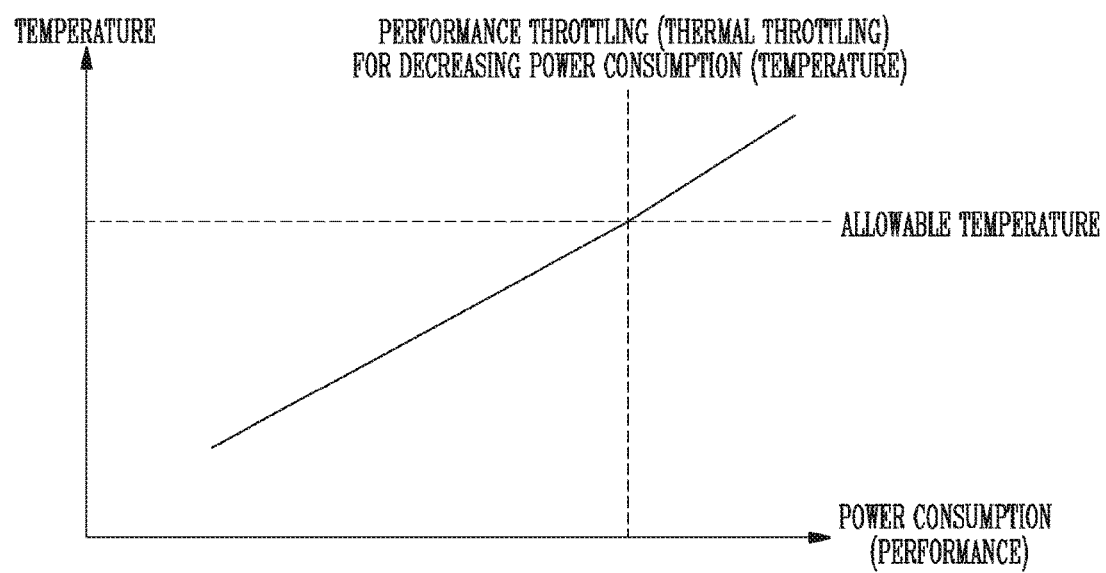
FIG. 4 is a diagram describing performance throttling depending on the temperature increase of a memory system.

FIG. 4 is a diagram describing performance throttling depending on the temperature increase of the memory system 1000.

Referring to FIG. 4, as power consumption or performance of the memory system 1000 increases, heat generation increases, and consequently the temperature of the memory system 1000 increases. Here, as the temperature of the memory system 1000 increases to a predetermined level or more, error may occur in the operation of the memory system 1000. Therefore, there is a need to control the temperature of the memory system 1000 to be less than the predetermined level.

The memory system 1000 may measure the temperature of the memory system 1000, and may then decrease the power consumption or performance of the memory system 1000 when the temperature of the memory system 1000 approaches or exceeds an allowable temperature as a result of measurement.

The power consumption of the memory system 1000 is proportional to the performance of the memory system 1000. In other words, as the performance of the memory system 1000 increases, the power consumption of the memory system 1000 may increase. Consequently, temperature control by the memory system 1000 may be performed by controlling the performance of the memory system 1000. In other words, when the temperature of the memory system 1000 is approaches or exceeds an allowable temperature, the temperature of the memory system 1000 may be decreased by reducing the performance of the memory system 1000. This is typically called performance throttling or thermal throttling.

Figure 5:
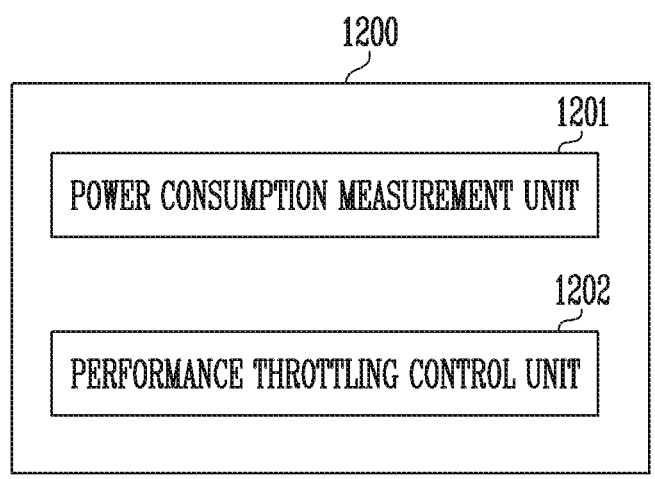
FIG. 5 is a diagram illustrating a memory controller according to an embodiment of the present disclosure.

FIG. 5 is a diagram illustrating the memory controller 1200 of FIG. 1.

Referring to FIG. 5, the memory controller 1200 may include a power consumption measurement unit 1201 and a performance throttling control unit 1202.

The power consumption measurement unit 1201 may measure power consumption of the memory system 1000. In an embodiment, the power consumption measurement unit 1201 may measure the power consumption of the memory system 1000 at intervals of a predetermined time period. The power consumption measurement unit 1201 may measure the power consumption of the memory system 1000 by measuring current consumption or by measuring the amount of heat generated from the memory system 1000, that is, temperature of the memory system 1000.

The performance throttling control unit 1202 may control the performance of the memory system 1000 based on the measured power consumption or the temperature of the memory system 1000. In an example, when the power consumption or temperature of the memory system 1000 is increased to a predetermined level or more, the performance throttling control unit 1202 may decrease the power consumption or temperature of the memory system 1000 by lowering the performance of the memory system 1000. Furthermore, when the power consumption or temperature of the memory system 1000 is decreased to less than the predetermined level, the performance throttling control unit 1202 may increase the performance of the memory system 1000. Through this operation, the power consumption measurement unit 1201 and the performance throttling control unit 1202 may control the performance of the memory system 1000 so that it does not excessively increase in order to control the heat generation or temperature of the memory system 1000 to be less than a predetermined level, and may manage the performance of the memory system 1000 so that it is not decreased below a required level.

Figure 6:
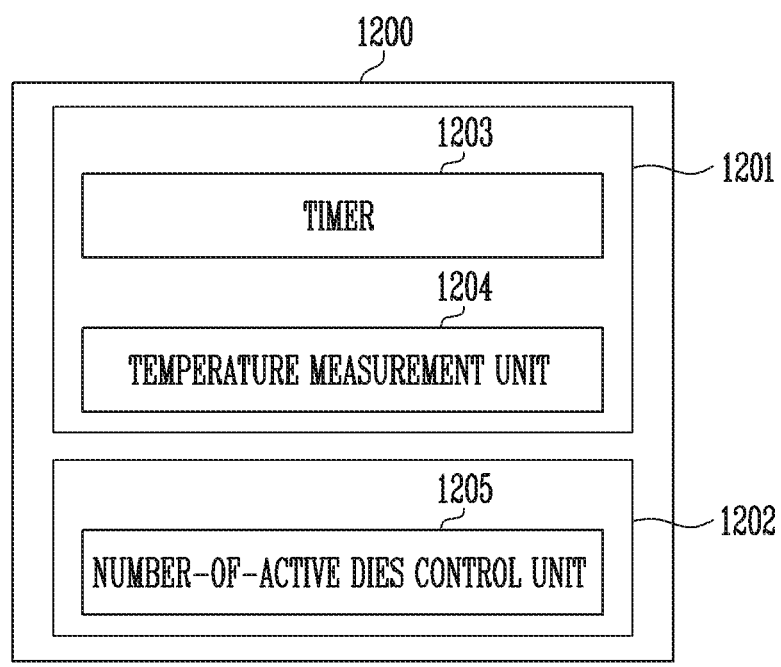
FIG. 6 is a diagram illustrating a memory controller according to an embodiment of the present disclosure.

FIG. 6 is a diagram illustrating an embodiment of the memory controller 1200 of FIG. 1.

Referring to FIG. 6, the power consumption measurement unit 1201 in the memory controller 1200 may include a timer 1203 and a temperature measurement unit 1204. Further, the performance throttling control unit 1202 in the memory controller 1200 may include a number-of-active dies control unit 1205.

The timer 1203 may function as a clock in the memory system 1000. The timer 1203 may transmit a temperature measurement execution signal to the temperature measurement unit 1204 at intervals of a predetermined time period. For example, the time period at which the timer 1203 transmits the temperature measurement execution signal to the temperature measurement unit 1204 may be "A" seconds. Here, "A" may be a positive rational number.

The temperature measurement unit 1204 may measure the temperature of the memory system 1000. As described above, when the performance of the memory system 1000 increases, the amount of heat generation also increases, and thus the temperature of the memory system 1000 may consequently increase. The temperature measurement unit 1204 may measure such a temperature change of the memory system 1000. Further, the temperature measurement unit 1204 may output a performance throttling execution signal for controlling the performance of the memory system 1000 when the temperature of the memory system 1000 is approximate to or higher than an allowable temperature. In another example, the temperature measurement unit 1204 may measure the temperature of the memory system 1000 and may output various performance throttling execution signals for respective temperature intervals. In an embodiment, the temperature measurement unit 1204 may output a performance increment signal when the temperature of the memory system 1000 falls within a first interval. The temperature measurement unit 1204 may output a performance maintenance signal when the temperature of the memory system 1000 falls within a second interval higher than the first interval. Further, the temperature measurement unit 1204 may output a performance decrement signal when the temperature of the memory system 1000 falls within a third interval higher than the second interval.

The temperature measurement unit 1204 may adjust target performance for the memory system 1000 based on the temperature of the memory system 1000, and may output a performance throttling execution signal based on the adjusted target performance. For example, assuming that the maximum performance of the memory system is 100 and current performance is 80, if the temperature of the memory system 1000 is 10% higher than an allowable temperature, the temperature measurement unit 1204 may adjust target performance corresponding to 72 that is 10% less than the current performance, and may output a performance throttling execution signal based on the adjusted target performance. In another example, assuming that the maximum performance of the memory system is 100 and current performance is 60, if the temperature of the memory system 1000 is 10% lower than the allowable temperature, the temperature measurement unit 1204 may adjust target performance corresponding to 66 that is 10% greater than the current performance, and may output a performance throttling execution signal based on the adjusted target performance.

The temperature measurement unit 1204 may be controlled by the timer 1203. That is, when a temperature measurement execution signal is received from the timer 1203, the temperature measurement unit 1204 may perform a temperature measurement operation in response to the temperature measurement execution signal. In other words, the temperature measurement unit 1204 may perform the temperature measurement operation upon receiving the temperature measurement execution signal from the timer 1203, may adjust target performance based on the measured temperature, and may output a performance throttling execution signal based on the adjusted target performance. For example, when the timer 1203 sends the temperature measurement execution signal at 1-second intervals, the temperature measurement unit 1204 may perform a temperature measurement operation at 1-second intervals, adjust target performance based on the measured temperature, and output a performance throttling execution signal based on the adjusted target performance. That is, the temperature measurement unit 1204 may output the performance throttling execution signal at 1-second intervals.

The number-of-active dies control unit 1205 may control the number of active memory devices 1100 that are operated simultaneously, that is, in parallel, in the memory system 1000. When the number of active memory devices 1100 that are simultaneously operated in the memory system 1000 increases, the performance of the memory system 1000 may increase, but the amount of heat generation increases, and thus the temperature of the memory system 1000 may consequently increase. In contrast, when the number of active memory devices 1100 that are simultaneously operated in the memory system 1000 decreases, the performance of the memory system 1000 decreases, but the amount of heat generation decreases, and thus the temperature of the memory system 1000 may consequently decrease. The number-of-active dies control unit 1205 may control the performance of the memory system 1000 by controlling the number of active memory devices 1100 that are simultaneously operated in the memory system 1000, thus consequently controlling the temperature of the memory system 1000. Typically, each memory device 1100 may also be referred to as a "memory die".

In an embodiment, when the memory system 1000 is composed of four channels and a single way is configured for each channel, the maximum number of active memory devices 1100, that is, active memory dies, that are simultaneously operable in the memory system 1000, may be 4. In this case, the memory system 1000 may be operated at maximum performance when the number of active memory devices 1100 that are simultaneously operated is 4. In other words, when the number of active memory devices 1100 that are simultaneously operated is 4, a maximum amount of heat may be generated from the memory system 1000.

Each memory device 1100 may perform a read operation, a program operation or an erase operation. The amounts of heat generated from the memory device 1100 may be different from each other for the read operation, the program operation, and the erase operation, respectively. That is, even in cases where the number of memory devices 1100 that are simultaneously operated in the memory system 1000 is identical, the amount of heat generation may differ depending on the operation performed by each memory device 1100, and thus the temperature of the memory system 1000 may differ. Further, the temperature of the memory system 1000 may be influenced by external temperature. For example, even if the number of memory devices 1100 that are simultaneously operated in the memory system 1000 is identical, the temperature of the memory system 1000 when the memory devices are operated in an environment in which ambient temperature is very high may be higher than that when the memory devices are operated in an environment in which ambient temperature is very low.

In an embodiment, when the memory system 1000 is composed of four channels, and eight ways are configured for each channel, the number of active memory devices 1100 that are simultaneously operable in the memory system 1000 may be a number obtained by multiplying the number of channels by the number of ways, that is, a maximum of 32. Here, the number-of-active dies control unit 1205 may decrease or increase the number of active channels or may decrease or increase the number of active ways, in order to control the number of active memory devices 1100 that are simultaneously operated.

The number-of-active dies control unit 1205 may be operated under the control of the temperature measurement unit 1204. In other words, the number-of-active dies control unit 1205 may initiate an operation of controlling the number of memory dies that are simultaneously operated in the memory system 1000 in response to the performance throttling execution signal received from the temperature measurement unit 1204. For example, the timer 1203 may output a temperature measurement execution signal at intervals of a predetermined time period, and the temperature measurement unit 1204 may perform a temperature measure operation for the memory system 1000 in response to the temperature measurement execution signal outputted from the timer 1203. Further, the temperature measurement unit 1204 may output a performance throttling execution signal based on the result of temperature measurement for the memory system 1000. The number-of-active dies control unit 1205 may control the number of active memory dies that are simultaneously operated in the memory system 1000 in response to the performance throttling execution signal outputted from the temperature measurement unit 1204. In an example, when the timer 1203 outputs the temperature measurement execution signal at 1-second intervals, the temperature measurement unit 1204 may measure temperature at 1-second intervals, and may output the performance throttling execution signal at 1-second intervals based on the result of measurement. Consequently, the number-of-active dies control unit 1205 may perform an operation of changing the number of active dies in the memory system 1000 at 1-second intervals.

In another example, the number-of-active dies control unit 1205 may perform an operation of changing the number of active memory dies that are simultaneously operated in the memory system 1000 at intervals of a time period shorter than a temperature measurement period of the temperature measurement unit 1204. For example, when the performance throttling execution signal is received from the temperature measurement unit 1204 at 1-second intervals, the number-of-active dies control unit 1205 may perform the operation of changing the number of active memory dies a plurality of times within a time of one second before a subsequent performance throttling execution signal is received from the temperature measurement unit 1204. This operation will be described in detail below.

Figure 7:
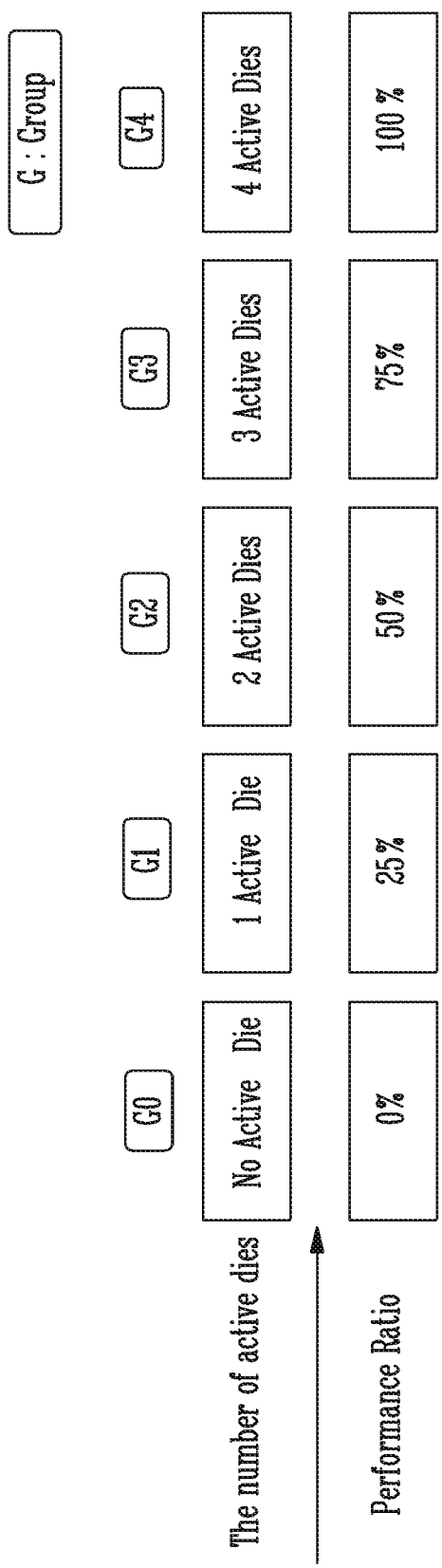
FIG. 7 is a diagram describing a relationship between the number of active memory dies and the performance of a memory system.

FIG. 7 is a diagram describing a relationship between the number of active memory dies and the performance of the memory system 1000.

Referring to FIG. 7, when the maximum number of active memory dies that are simultaneously operable in the memory system 1000 is, for example, 4, the number of active memory dies that are simultaneously operated in the memory system 1000 may range from a minimum of 0 to a maximum of 4. FIG. 7 illustrates a relationship between the number of active memory dies that are simultaneously operable in the memory system 1000 and the performance ratio of the memory system 1000. For example, when the number of active memory dies that are simultaneously operated in the memory system 1000 is 4 (hereinafter referred to as a "fourth group G4"), the memory system 1000 may exhibit a maximum performance, that is, a performance of 100%. Further, when the number of active memory dies that are simultaneously operated in the memory system 1000 is 3 (hereinafter referred to as a "third group G3"), the memory system 1000 may exhibit a performance of 75%. When the number of active memory dies that are simultaneously operated in the memory system 1000 is 2 (hereinafter referred to as a "second group G2"), the memory system 1000 may exhibit a performance of 50%. Furthermore, when the number of active memory dies that are simultaneously operated in the memory system 1000 is 1 (hereinafter referred to as a "first group G1"), the memory system 1000 may exhibit a performance of 25%. When the number of active memory dies that are simultaneously operated in the memory system 1000 is 0 (hereinafter referred to as an "inactive group G0"), the memory system 1000 may exhibit a performance of 0%. Consequently, as the number of active memory dies that are simultaneously operated increases, the performance of the memory system 1000 may approach the maximum performance, that is, 100%. A value indicative of a relationship between the number of active memory dies and performance is only an example, which may vary in an actual operation.

Figure 8:
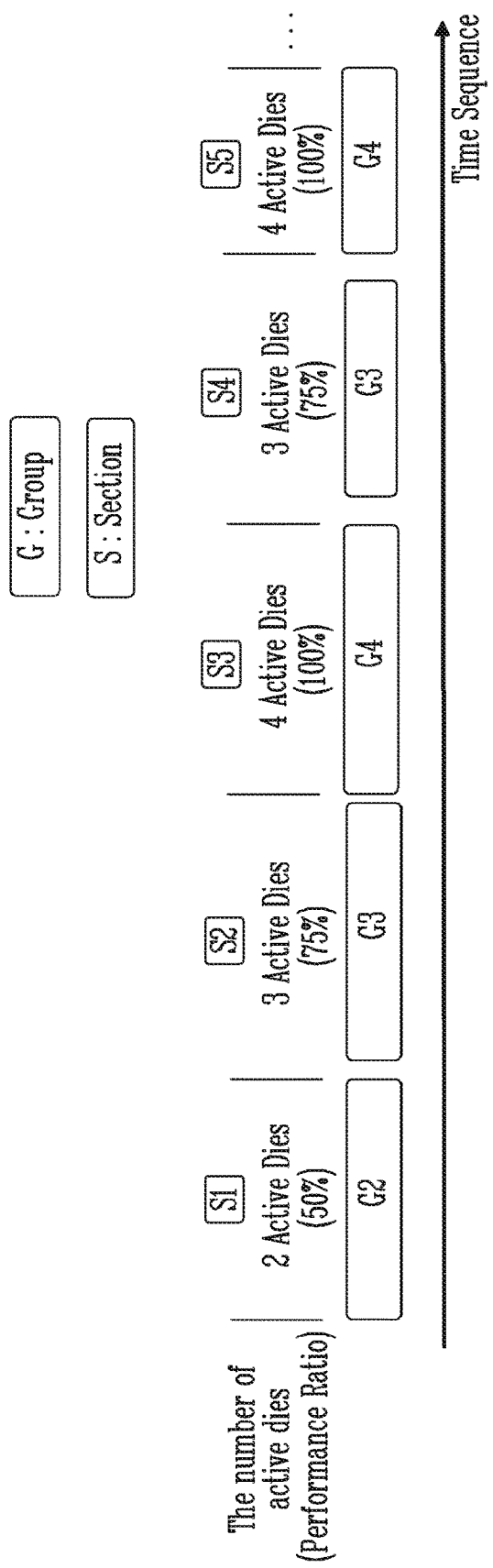
FIG. 8 is a diagram illustrating a performance throttling method according to an embodiment of the disclosure.

FIG. 8 is a diagram illustrating a performance throttling method according to an embodiment of the present disclosure.

FIG. 8 illustrates an operation of controlling the performance of the memory system 1000 by changing the number of active memory dies for a case where the maximum number of active memory dies that are simultaneously operable in the memory system 1000 is 4, thus consequently controlling the temperature of the memory system 1000. As described above, the temperature measurement unit 1204 may measure the temperature of the memory system 1000 at intervals of a predetermined time period under the control of the timer 1203, and may output a performance throttling execution signal based on the result of measurement. Further, the number-of-active dies control unit 1205 may control the number of active memory dies that are simultaneously operated in the memory system 1000 in response to the performance throttling execution signal outputted from the temperature measurement unit 1204. In this case, a single time period during which the performance throttling execution signal is outputted from the temperature measurement unit 1204 may be referred to as a "section". In other words, the number-of-active dies control unit 1205 may change the number of active memory dies that are simultaneously operated in the memory system 1000 for each section.

In an embodiment in which the memory system 1000 for which the maximum number of active memory dies that are simultaneously operable is 4, when the number of active memory dies that are simultaneously operated for a first section S1 is 2, a performance ratio at that time may be 50% compared to the maximum performance, as described above. Here, at a time at which the first section S1 is terminated, the temperature measurement unit 1204 may again measure temperature, and may output a performance throttling execution signal based on the result of measurement. At this time, when the result of temperature measurement by the temperature measurement unit 1204 is lower than a reference temperature, the performance throttling execution signal may be a signal for further increasing performance. Alternatively, the performance throttling execution signal at this time may be a signal causing the memory system 1000 to be operated at a target performance of 75%. In this case, the number-of-active dies control unit 1205 may change the number of active memory dies so that the performance is further increased in response to the performance throttling execution signal outputted from the temperature measurement unit 1204, and may consequently set the number of active memory dies to 3. As a result, the number of active memory dies that are simultaneously operated in the memory system 1000 for a second section S2 may be adjusted to 3.

At a time at which the second section S2 is terminated, the temperature measurement unit 1204 may again measure temperature and may output a performance throttling execution signal based on the result of measurement. Here, when the result of temperature measurement by the temperature measurement unit 1204 is less than the reference temperature, the performance throttling execution signal may be a signal for further increasing performance. The performance throttling execution signal at this time may be signal causing the memory system 1000 to be operated at a target performance of 100%. In this case, the number-of-active dies control unit 1205 may change the number of active memory dies so that the performance is further increased in response to the performance throttling execution signal outputted from the temperature measurement unit 1204, and may consequently set the number of active memory dies to 4. As a result, the number of active memory dies that are simultaneously operated in the memory system 1000 for a third section S3 may be adjusted to 4.

At a time at which the third section S3 is terminated, the temperature measurement unit 1204 may again measure temperature, and may output a performance throttling execution signal based on the result of measurement. Here, when the result of temperature measurement by the temperature measurement unit 1204 is higher than the reference temperature, the performance throttling execution signal may be a signal for decreasing performance. The performance throttling execution signal at this time may be signal causing the memory system 1000 to be operated at a target performance of 75%. In this case, the number-of-active dies control unit 1205 may change the number of active memory dies so that performance is further decreased in response to the performance throttling execution signal outputted from the temperature measurement unit 1204, and may consequently set the number of active memory dies to 3. As a result, the number of active memory dies that are simultaneously operated in the memory system 1000 for a fourth section S4 may be adjusted to 3.

At a time at which the fourth section S4 is terminated, the temperature measurement unit 1204 may again measure temperature and may output a performance throttling execution signal based on the result of measurement. Here, when the result of temperature measurement by the temperature measurement unit 1204 is less than the reference temperature, the performance throttling execution signal may be a signal for further increasing performance. The performance throttling execution signal at this time may be signal causing the memory system 1000 to be operated at a target performance of 100%. In this case, the number-of-active dies control unit 1205 may change the number of active memory dies so that the performance is further increased in response to the performance throttling execution signal outputted from the temperature measurement unit 1204, and may consequently set the number of active memory dies to 4. As a result, the number of active memory dies that are simultaneously operated in the memory system 1000 for a fifth section S5 may be adjusted to 4.

As described above, the number-of-active dies control unit 1205 may perform the operation of changing the number of active memory dies in the memory system 1000 at intervals of the temperature measurement period of the temperature measurement unit 1204. In other words, when the temperature measurement period of the temperature measurement unit 1204 is 1 second, the number-of-active dies control unit 1205 may perform the operation of changing the number of active memory dies in the memory system 1000 at 1-second intervals.

Figure 9:
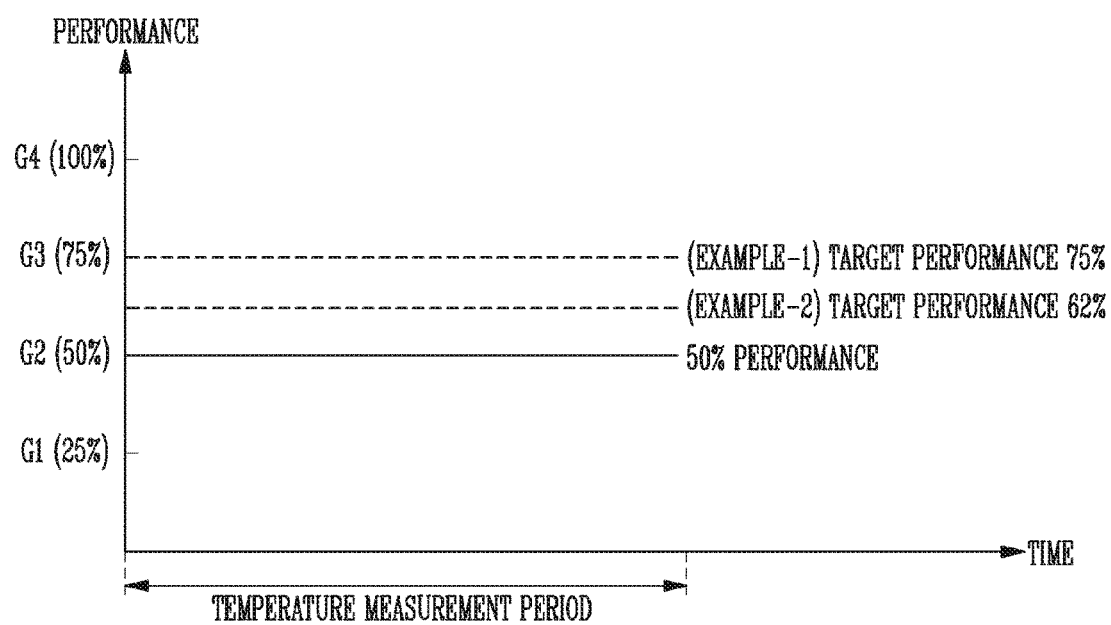
FIG. 9 is a diagram illustrating in more detail the performance throttling method of FIG. 8.

FIG. 9 is a diagram illustrating in more detail the performance throttling method of FIG. 8.

Referring to FIG. 9, the temperature measurement unit 1204 may measure the temperature of the memory system 1000 and may adjust a target performance based on the measured temperature. In an example, the adjusted target performance is 75% and the temperature measurement unit 1204 may output a performance throttling execution signal based on the adjusted target performance. Here, the number-of-active dies control unit 1205 may set the number of active memory dies based on the performance throttling execution signal outputted from the temperature measurement unit 1204 to the third group G3. When the number-of-active dies control unit 1205 sets the number of active memory dies to the third group G3, it may exhibit a performance of 75%, and thus actual performance of the memory system 1000 may be identical to the target performance.

In another example, when the target performance adjusted by the temperature measurement unit 1204 is 62%, which is a value between 50% and 75%, the number-of-active dies control unit 1205 may set the number of active memory dies to any one of the second group G2 and the third group G3. When the number-of-active dies control unit 1205 sets the number of active memory dies to the second group G2, the memory system 1000 may exhibit a performance of 50%, which is 12% less than the target performance. Furthermore, when the number-of-active dies control unit 1205 sets the number of active memory dies to the third group G3, the memory system 1000 may exhibit a performance of 75%, which is 13% greater than the target performance.

Figure 10:
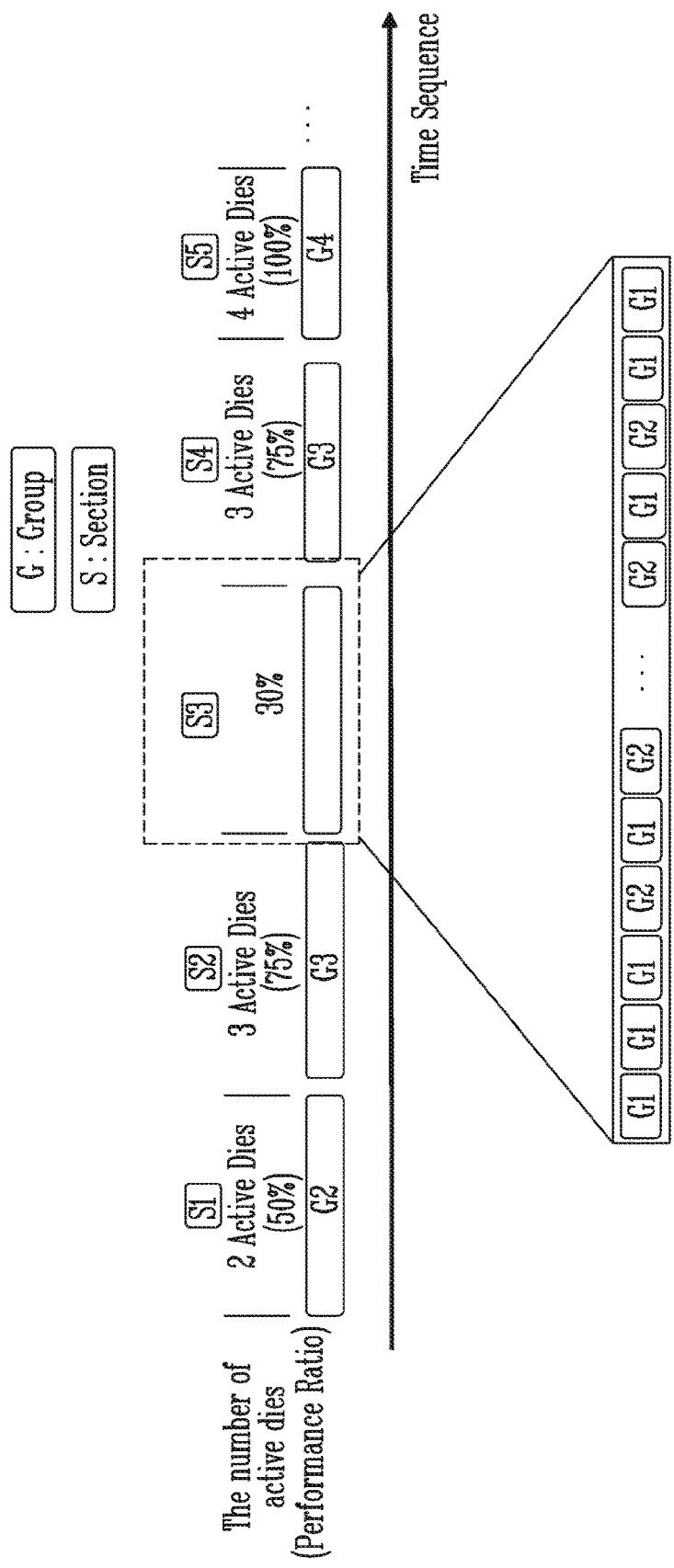
FIG. 10 is a diagram illustrating a performance throttling method according to an embodiment of the disclosure.

FIG. 10 is a diagram illustrating a performance throttling method according to an embodiment of the present disclosure.

FIG. 10 illustrates an operation of controlling the performance of the memory system 1000 by changing the number of active memory dies in a case where the maximum number of active memory dies that are simultaneously operable in the memory system 1000 is 4, thus consequently controlling the temperature of the memory system 1000. Referring to FIG. 10, the number-of-active dies control unit 1205 may perform the operation of changing the number of active memory dies in the memory system 1000 at intervals of a time period shorter than the temperature measurement period of the temperature measurement unit 1204, that is, a plurality of times within one section. In an example, when the temperature measurement period of the temperature measurement unit 1204 is 1 second, the number-of-active dies control unit 1205 may perform the operation of changing the number of active memory dies in the memory system 1000 at intervals of a time period shorter than 1 second.

At a time point at which a second section S2 is terminated, the temperature measurement unit 1204 may again measure temperature, and may output a performance throttling execution signal based on the result of measurement. Here, as the result of temperature measurement by the temperature measurement unit 1204, the target performance of the memory system 1000 may be set to 30%. As described above, when the number of active memory dies in the memory system 1000 is the first group G1, the performance ratio of the memory system 1000 may be 25%, whereas when the number of active memory dies in the memory system 1000 is the second group G2, the performance ratio of the memory system 1000 may be 50%. In other words, when the target performance is 30%, the number of active memory dies in the memory system 1000 should be a certain value between the first group G1 and the second group G2. In order to implement this operation, the memory system 1000 may be operated by suitably distributing the first group G1 in which a performance ratio is 25% (i.e., a case where the number of active memory dies is 1) and the second group G2 in which the performance ratio is 50% (i.e., a case where the number of active memory dies is 2) for a third section S3. That is, if the memory system 1000 is set such that the first group G1 in which the performance ratio is 25% and the second group G2 in which the performance ratio is 50% are operated at a ratio of 4:1, the memory system 1000 may exhibit an average performance ratio of 30% for the third section S3. In other words, if the set target performance is greater than target performance given when the number of active memory dies is N (where N is an integer of 0 or more) and is less than target performance given when the number of active memory dies is (N+1), the number-of-active dies control unit 1205 may determine, based on the set target performance, the ratio of a time during which the number of active memory dies is controlled to N to a time during which the number of active memory dies is controlled to (N+1), within the time period.

As described above, in order to control the memory system 1000 to be operated at a precise performance ratio, the number-of-active dies control unit 1205 may perform the operation of changing the number of active memory dies in the memory system 1000 at intervals of a time period shorter than the temperature measurement period of the temperature measurement unit 1204, that is, a plurality of times within one section. Also, as the number-of-active dies control unit 1205 performs the operation of changing the number of active memory dies in the memory system 1000 at higher frequency within one section, the performance of the memory system 1000 may be more precisely controlled.

In an embodiment, when the number-of-active dies control unit 1205 may perform the operation of changing the number of active memory dies in the memory system 1000 20 times within one section, the memory system 1000 may perform control such that the first group G1 in which a performance ratio is 25% and the second group G2 in which a performance ratio is 50% are operated at a ratio of 4:1 for the third section S3. That is, the memory system 1000 may perform control such that the first group G1 is first operated 16 times, and the second group G2 is subsequently operated four times. In this case, the total average performance of the third section S3 may approach 30%. However, in a first part of the third section S3, the memory system 1000 may be operated at performance less than the target performance, and in a latter part of the third section S3, the memory system 1000 may be operated at performance greater than the target performance.

In another embodiment, when the number-of-active dies control unit 1205 is capable of performing, 20 times, the operation of changing the number of active memory dies in the memory system 1000 during the third section S3, the memory system 1000 may perform control such that the first group G1 in which the performance ratio is 25% and the second group G2 in which the performance ratio is 50% are operated at a ratio of 4:1 for the third section S3. That is, the memory system 1000 may perform control such that the first group G1 and the second group G2 are uniformly distributed and operated within the third section S3. In an example, after the memory system 1000 is operated four times using the first group G1, the memory system 1000 may be operated once using the second group G2. Subsequently, the memory system 1000 may be operated four times using the first group G1, and may then be operated once using the second group G2. In the latter embodiment, the distribution of performance may be more precisely realized than the former embodiment, and the overall performance of the memory system 1000 within the third section S3 may be similar to the target performance. As a result, the temperature of the memory system 1000 may be more precisely controlled.

In other words, when target performance is given within one section, a plurality of different groups may be controlled to be entirely, uniformly distributed within the section in a condition in which a given ratio is satisfied. That is, if the set target performance is greater than target performance given when the number of active memory dies is N (where N is an integer of 0 or more) and is less than target performance given when the number of active memory dies is (N+1), the number-of-active dies control unit 1205 may determine, based on the set target performance, the ratio of a time during which the number of active memory dies is controlled to N to a time during which the number of active memory dies is controlled to (N+1), within the time period.

In an example, the temperature measurement period may be 1 second, and the memory system 1000 may perform a plurality of program, read, or erase operations for one second. For example, when 1000 read operations and 100 program operations occur during 1 second that is the temperature measurement period, the number-of-active dies control unit 1205 may perform an operation of changing the number of active dies in the memory system 1000 several tens to several hundreds of times. In other words, a method of changing the number of active dies, which is described with reference to FIG. 10, may be performed even for very precise target performance.

The number-of-active dies control unit 1205 may perform an operation of changing the number of active memory dies in the memory system 1000 a plurality of times within one section by controlling the transmission of a read, program, or erase command to memory devices 1100. In an embodiment, when performing the operation of decreasing the number of active memory dies (i.e., the memory devices 1100), the number-of-active dies control unit 1205 may delay the transmission of a read, program, or erase command to the memory devices 1100. That is, when performing the operation of decreasing the number of active memory devices 1100, the number-of-active dies control unit 1205 may control the number of memory devices 1100 that are simultaneously operated by applying the read, program, or erase command to memory devices 1100 coupled to a second channel after the read, program, or erase operation on memory devices 1100 coupled to a first channel has been terminated.

Figure 11:
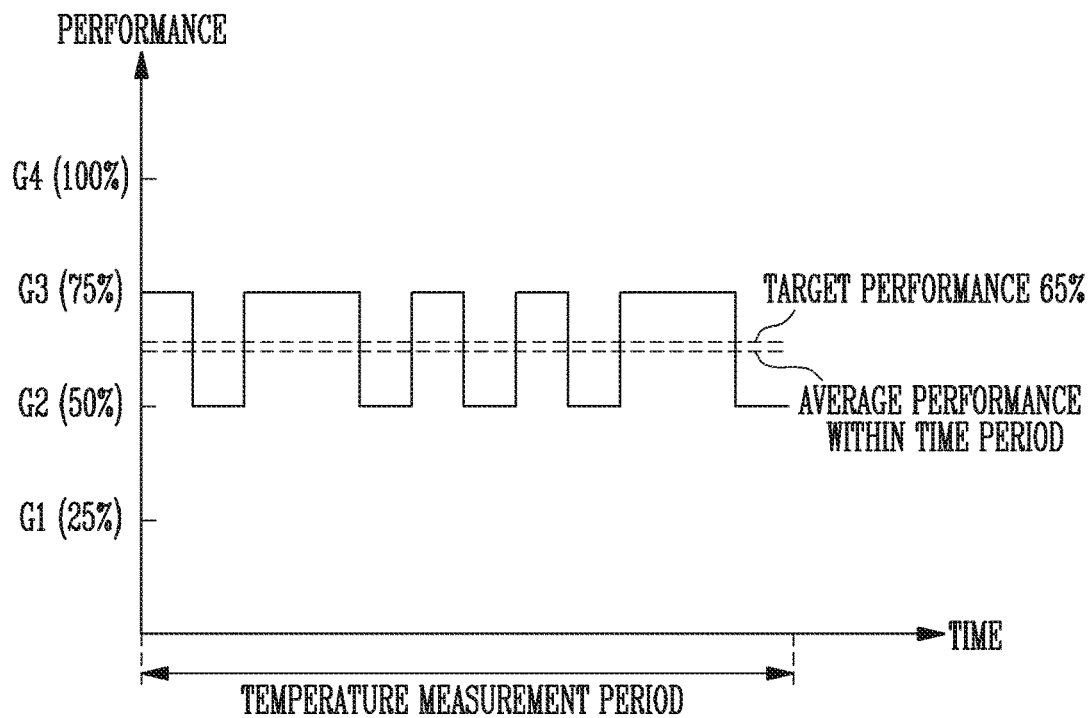
FIG. 11 is a diagram illustrating in more detail the performance throttling method of FIG. 10.

FIG. 11 is a diagram describing in more detail the performance throttling method of FIG. 10.

Referring to FIG. 11, the temperature measurement unit 1204 may measure temperature of the memory system 1000 and may adjust target performance based on the measured temperature. For example, when the adjusted target performance is 65%, which is a value between 50% and 75%, the number-of-active dies control unit 1205, described above with reference to FIG. 10, may alternately set the number of active memory dies within a temperature measurement period to the second group G2 or the third group G3. When the number-of-active dies control unit 1205 sets the number of active memory dies to the second group G2, the memory system 1000 exhibits a performance of 50% and is then operated at performance that is 15% less than the target performance. Further, when the number-of-active dies control unit 1205 sets the number of active memory dies to the third group G3, the memory system 1000 exhibits a performance of 75% and is then operated at performance that is 10% greater than the target performance. The number-of-active dies control unit 1205 may set the number of active memory dies by suitably mixing the second group G2 and the third group G3 in order to exhibit a target performance of 65% within one temperature measurement period. In other words, in order to exhibit performance close to 65% on average within one temperature measurement period, the number-of-active dies control unit 1205 allows the memory system 1000 to be operated by setting the ratio of the second group G2 to the third group G3 to 2:3. Also, the number-of-active dies control unit 1205 may set the ratio of the second group G2 to the third group G3 to 2:3 in order to exhibit the performance close to 65% on average within one temperature measurement period, but may set the ratio so that the second and third groups G2 and G3 are entirely, uniformly distributed within a given time period, that is, within a section.

Figure 12:
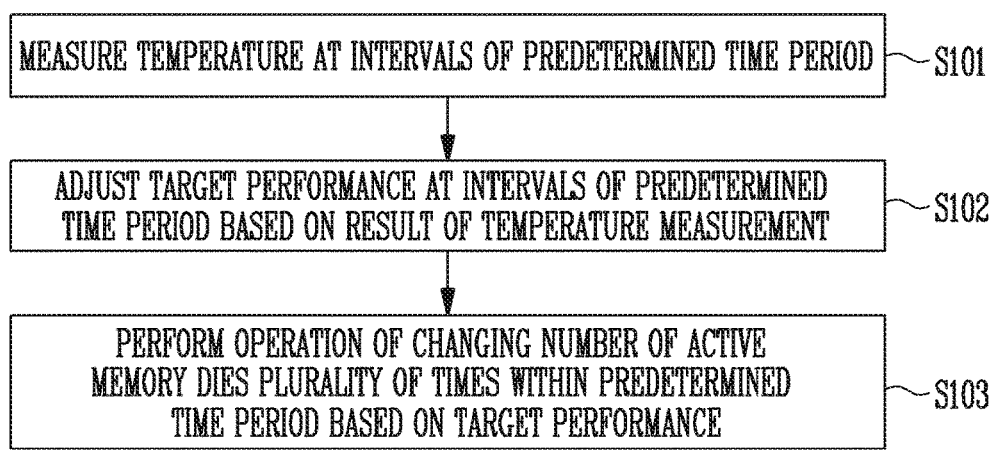
FIG. 12 is a flowchart illustrating a performance throttling method according to an embodiment of the disclosure.

FIG. 12 is a flowchart describing a performance throttling method according to an embodiment of the present disclosure.

Referring to FIG. 12, the memory system 1000 may perform an operation of controlling performance based on temperature.

The method of operating the memory system 1000, which controls performance depending on temperature, may include step S101 of measuring temperature at intervals of a predetermined time period. Further, at step S102, target performance may be adjusted at intervals of the predetermined time period based on the result of temperature measurement. Steps S101 and S102 may be performed by the power consumption measurement unit 1201 of FIG. 5 or by the timer 1203 and the temperature measurement unit 1204 of FIG. 6. Next, at step S103, an operation of changing the number of active memory dies a plurality of times within the predetermined time period may be performed based on the target performance. Step S103 may be performed by the performance throttling control unit 1202 of FIG. 5 or by the number-of-active dies control unit 1205 of FIG. 6.

Further, step S103 of performing the operation of changing the number of active memory dies a plurality of times within the predetermined time period based on the target performance may include the step of performing control such that an operation of deactivating some of a plurality of channels coupled to memory dies is performed or such that a case where the number of active memory dies is N (where N is an integer of 0 or more) and a case where the number of active memory dies is (N+1) are alternately operated at a predetermined ratio within the time period. In this case, control may be performed such that the case where the number of active memory dies is N and the case where the number of active memory dies is (N+1) are entirely, uniformly distributed within the time period.

Figure 13:
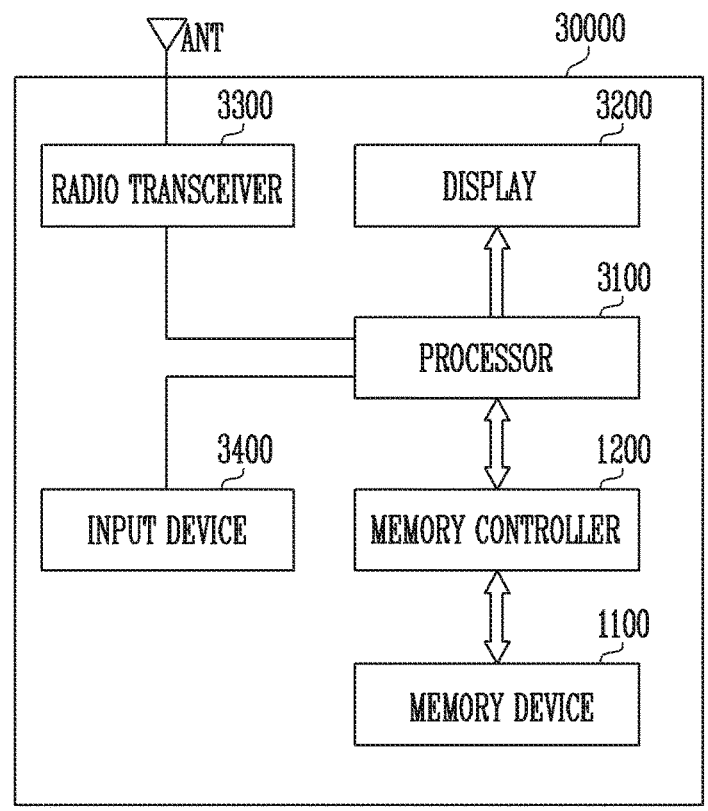
FIG. 13 is a diagram illustrating an embodiment of a memory system including the memory controller of FIG. 5 or FIG. 6.

FIG. 13 is a diagram illustrating an application example of a memory system including the memory controller illustrated in FIG. 5 or FIG. 6.

Referring to FIG. 13, a memory system 30000 may be included in a cellular phone, a smartphone, a tablet PC, a personal digital assistant (PDA) or a wireless communication device. The memory system 30000 may include the memory device 1100 and a memory controller 1200 capable of controlling the operation of the memory device 1100. The memory controller 1200 may control a data access operation, e.g., a program, erase, or read operation, of the memory device 1100 under the control of a processor 3100.

Data programmed in the memory device 1100 may be output through a display 3200 under the control of the memory controller 1200.

A radio transceiver 3300 may send and receive radio signals through an antenna ANT. For example, the radio transceiver 3300 may change a radio signal received through the antenna ANT into a signal which may be processed by the processor 3100. Therefore, the processor 3100 may process a signal output from the radio transceiver 3300 and transmit the processed signal to the memory controller 1200 or the display 3200. The memory controller 1200 may program a signal processed by the processor 3100 to the memory device 1100. Furthermore, the radio transceiver 3300 may change a signal output from the processor 3100 into a radio signal, and output the changed radio signal to the external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data output from the memory controller 1200, data output from the radio transceiver 3300, or data output from the input device 3400 is output through the display 3200.

In an embodiment, the memory controller 1200 capable of controlling the operation of the memory device 1100 may be implemented as a part of the processor 3100 or a chip provided separately from the processor 3100. Further, the memory controller 1200 may be implemented through the example of the memory controller, illustrated in FIG. 5 or FIG. 6.

Figure 14:
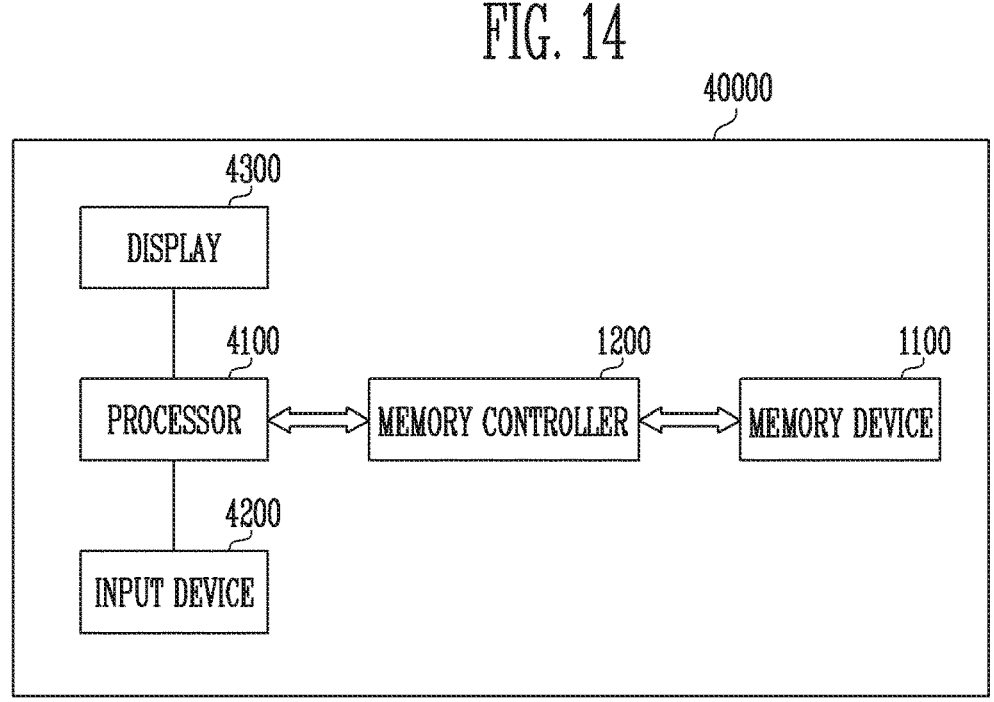
FIG. 14 is a diagram illustrating an embodiment of a memory system including the memory controller of FIG. 5 or FIG. 6.

FIG. 14 is a diagram illustrating an application example of the memory system including the memory controller illustrated in FIG. 5 or FIG. 6.

Referring to FIG. 14, a memory system 40000 may be included in a personal computer, a tablet PC, a net-book, an e-reader, a personal digital assistant (PDA), a portable multimedia player (PMP), an MP3 player, or an MP4 player.

The memory system 40000 may include the memory device 1100 and a memory controller 1200 capable of controlling the data processing operation of the memory device 1100.

A processor 4100 may output data stored in the memory device 1100 through a display 4300, according to data input from an input device 4200. For example, the input device 4200 may be implemented as a point device such as a touch pad or a computer mouse, a keypad or a keyboard.

The processor 4100 may control the overall operation of the memory system 40000 and control the operation of the memory controller 1200. In an embodiment, the memory controller 1200 capable of controlling the operation of the memory device 1100 may be implemented as a part of the processor 4100 or a chip provided separately from the processor 4100. Further, the memory controller 1200 may be implemented through the example of the memory controller, illustrated in FIG. 5 or FIG. 6.

Figure 15:
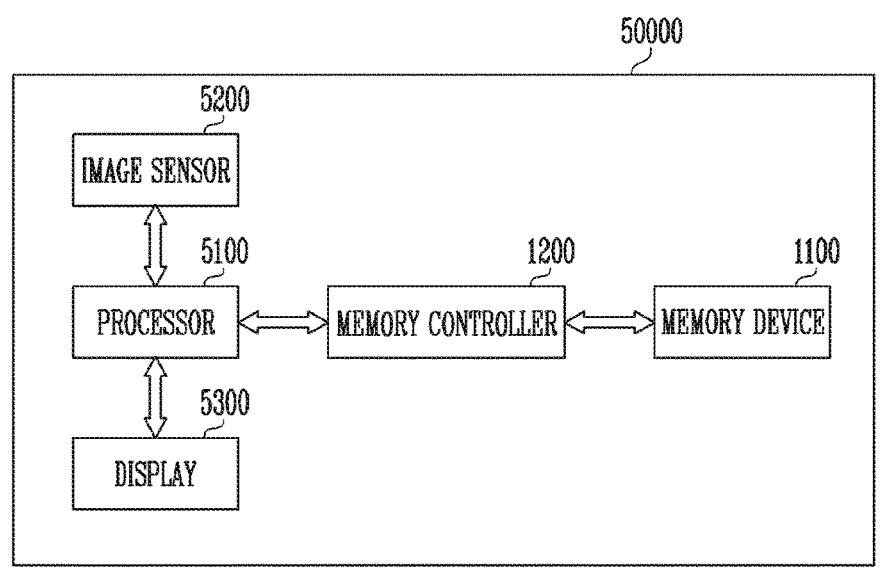
FIG. 15 is a diagram illustrating an embodiment of a memory system including the memory controller of FIG. 5 or FIG. 6.

FIG. 15 is a diagram illustrating an application example of the memory system including the memory controller, illustrated in FIG. 5 or FIG. 6.

Referring to FIG. 15, a memory system 50000 may be included in an image processing device, e.g., a digital camera, a portable phone provided with a digital camera, a smartphone provided with a digital camera, or a tablet PC provided with a digital camera.

The memory system 50000 may include the memory device 1100 and a memory controller 1200 capable of controlling a data processing operation, e.g., a program, erase, or read operation, of the memory device 1100.

An image sensor 5200 of the memory system 50000 may convert an optical image into digital signals. The converted digital signals may be transmitted to a processor 5100 or the memory controller 1200. Under the control of the processor 5100, the converted digital signals may be output through a display 5300 or stored in the memory device 1100 through the memory controller 1200. Data stored in the memory device 1100 may be output through the display 5300 under the control of the processor 5100 or the memory controller 1200.

In an embodiment, the memory controller 1200 capable of controlling the operation of the memory device 1100 may be implemented as a part of the processor 5100, or a chip provided separately from the processor 5100. Further, the memory controller 1200 may be implemented through the example of the memory controller, illustrated in FIG. 5 or FIG. 6.

Figure 16:
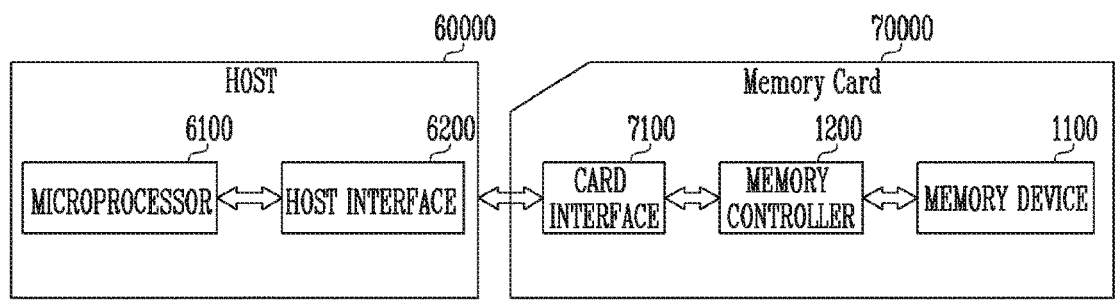
FIG. 16 is a diagram illustrating an embodiment of a memory system including the memory controller of FIG. 5 or FIG. 6.

FIG. 16 is a diagram illustrating an application example of the memory system including the memory controller, illustrated in FIG. 5 or FIG. 6.

Referring to FIG. 16, a memory system 70000 may be included in a memory card or a smart card. The memory system 70000 may include the memory device 1100, a memory controller 1200 and a card interface 7100.

The memory controller 1200 may control data exchange between the memory device 1100 and the card interface 7100. In an embodiment, the card interface 7100 may be a secure digital (SD) card interface or a multi-media card (MMC) interface, but it is not limited thereto. Further, the memory controller 1200 may be implemented through the example of the memory controller, illustrated in FIG. 5 or FIG. 6.

The card interface 7100 may interface data exchange between a host 60000 and the memory controller 1200 according to a protocol of the host 60000. In an embodiment, the card interface 7100 may support a universal serial bus (USB) protocol, and an inter-chip (IC)-USB protocol. Here, the card interface may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the memory controller 1200 under the control of a microprocessor 6100.

The present disclosure may perform an operation of changing the number of active memory devices a plurality of times within a temperature measurement period in the operation of a memory system, thus precisely controlling the temperature and performance of the memory system itself.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system, comprising:
   a memory controller; and
   a plurality of memory devices coupled to the memory controller through a plurality of channels,
   wherein the memory controller comprises:
   a power consumption measurement unit configured to measure power consumption of a memory system at intervals of a predetermined time period and to generate a first signal based on the measured power consumption; and
   a performance throttling control unit configured to perform operations of changing a performance of the memory system within a single interval among the intervals of the predetermined time period, in response to the first signal,
   wherein at least one of the operations includes increasing the performance of the memory system, and remaining operations of the operations include decreasing the performance of the memory system.

2. The memory system according to claim 1, wherein the operations of changing the performance of the memory system comprise an operation of changing a number of active memory devices, among the memory devices.

3. The memory system according to claim 1, wherein the first signal indicates a target performance of the memory system.

4. The memory system according to claim 3, wherein the performance throttling control unit is configured to perform an operation of changing a number of active memory devices, among the memory devices, a plurality of times within the single interval in response to the first signal.

5. The memory system according to claim 3, wherein, if the target performance is greater than a target performance given when a number of active memory devices, among the memory devices, is N (where N is an integer of 0 or more) and is less than a target performance given when the number of active memory devices is (N+1), the performance throttling control unit is configured to control the number of active memory devices to N during a first time of the single interval and to control the number of active memory devices to (N+1) during a second time of the single interval.

6. The memory system according to claim 1, wherein the performance throttling control unit is configured to perform the operations of changing the performance of the memory system by controlling transmission of commands for the memory devices.

7. The memory system according to claim 6, wherein:
   the power consumption measurement unit comprises a timer,
   the timer generates a second signal at intervals of the predetermined time period,
   the temperature measurement unit measures a temperature of the memory system in response to the second signal.

8. The memory system according to claim 2, wherein the operation of changing the number of active memory devices comprises an operation of deactivating a part of the plurality of channels.

9. A memory system, comprising:
   a memory controller; and
   a plurality of memory dies coupled to the memory controller through a plurality of channels,
   wherein the memory controller comprises:
   a temperature measurement unit configured to measure a temperature of the memory system at intervals of a predetermined time period and to adjust a target performance of the memory system based on the measured temperature; and
   a number-of-active dies control unit configured to perform operations of changing a number of active memory dies, among the memory dies, within a single interval among the intervals of the predetermined time period, in response to the target performance,
   wherein at least one of the operations includes increasing the number of active memory dies, and remaining operations of the operations include decreasing the number of active memory dies.

10. The memory system according to claim 9, wherein the number-of-active dies control unit is configured to, when a performance of the memory system during the single interval is greater than the target performance, decrease the number of active memory dies during an interval subsequent to the single interval.

11. The memory system according to claim 9, wherein, if the adjusted target performance is greater than a target performance given when the number of active memory dies is N (where N is an integer of 0 or more) and is less than a target performance given when the number of active memory dies is (N+1), the number-of-active dies control unit is configured to control the number of active memory dies to N during a first time of the single interval and to control the number of active memory dies to (N+1) during a second time of the single interval.

12. The memory system according to claim 10, wherein:
the memory controller comprises a timer configured to generate a temperature measurement execution signal at intervals of the predetermined time period, and
the temperature measurement unit is configured to adjust the target performance of the memory system in response to the temperature measurement execution signal.

13. The memory system according to claim 9, wherein the operations of changing the number of active memory dies comprise an operation of deactivating a part of the plurality of channels.

14. The memory system according to claim 9, wherein, if the adjusted target performance is greater than a target performance given when the number of active memory dies is N (where N is an integer of 0 or more) and is less than a target performance given when the number of active memory dies is (N+1), the number-of-active dies control unit is configured to determine, based on the adjusted target performance, a ratio of a time during which the number of active memory dies is controlled to N to a time during which the number of active memory dies is controlled to (N+1), within the single interval.

15. The memory system according to claim 9, wherein the number-of-active dies control unit is configured to perform the operations of changing the number of active memory dies by controlling transmission of commands for the memory dies.

16. A method of operating a memory system, comprising:
measuring a temperature at intervals of a predetermined time period;
adjusting a target performance at intervals of the predetermined time period based on a result of temperature measurement; and
performing operations of controlling a number of active memory dies within a single interval, among the intervals of the predetermined time period, based on the target performance,
wherein at least one of the operations includes increasing the number of active memory dies, and remaining operations of the operations include decreasing the number of active memory dies.

17. The method according to claim 16, wherein, if the target performance is less than a current performance, the operations of controlling the number of active memory dies comprise an operation of decreasing the number of active memory dies.

18. The method according to claim 16, wherein if the adjusted target performance is greater than a target performance given when the number of active memory dies is N (where N is an integer of 0 or more) and is less than a target performance given when the number of active memory dies is (N+1), the number of active memory dies is N during a first time of the single interval, and the number of active memory dies is (N+1) during a second time of the single interval.

19. The method according to claim 16, wherein the operations of controlling the number of active memory dies comprise an operation of deactivating a part of a plurality of channels coupled to the active memory dies.

20. The method according to claim 16, wherein:
the operations of controlling the number of active memory dies comprise an operation of allowing a case where the number of active memory dies is N (where N is an integer of 0 or more) and a case where the number of active memory dies is (N+1) to be alternately operated at a certain ratio within the single interval based on the target performance, and
the case where the number of active memory dies is N and the case where the number of active memory dies is (N+1) are entirely, uniformly distributed within the single interval.

* * * * *